United States Patent

Lightbody

[15] 3,646,599
[45] Feb. 29, 1972

[54] APPARATUS FOR A METHOD OF FORMING COILED TUBE BANKS

[72] Inventor: Alexander Lightbody, 1 Weaver Lane, Kilbarchan, Renefrewshire, Scotland

[22] Filed: May 26, 1969

[21] Appl. No.: 827,625

[52] U.S. Cl. .................................................. 72/147, 242/82
[51] Int. Cl. ...................................... B21c 47/00, B21f 3/04
[58] Field of Search ............... 72/144, 147, 142, 143; 242/82

[56] References Cited

UNITED STATES PATENTS

| | | | |
|---|---|---|---|
| 379,393 | 3/1888 | Harvey | 72/144 |
| 1,630,912 | 5/1927 | Whittingham | 72/143 |
| 3,415,092 | 12/1968 | Dean | 72/144 |
| 3,433,041 | 3/1969 | Cavagnero | 72/143 |

*Primary Examiner*—Charles W. Lanham
*Assistant Examiner*—R. M. Rogers
*Attorney*—J. Maguire

[57] ABSTRACT

A method of forming tube banks having means in the form of guide rollers for controlling the feed of the tubes to a rotating core for the effective production of an acceptable core of controlled dimension.

An apparatus for use in forming such tube bank adapted with guide rollers having braking means for use in controlling the speed at which a tube is fed to the rotating core.

5 Claims, 4 Drawing Figures

APPARATUS FOR A METHOD OF FORMING COILED TUBE BANKS

This invention relates to apparatus for and a method of forming coiled tube banks.

Thus, according to the present invention there is provided a machine arranged to rotate a removable cylindrical core for the coiled tube bank, anchoring means for securing tubes relative to the core on tube coil spacer bars and traversable guide rollers for the tubes adapted to retard passage of tubes therethrough by an amount sufficient to overcome the effect of spring back forces arising during a coiling operation.

The invention also includes a method of forming a coiled tube bank including positioning spacer bars on a cylindrical core, locating the spacer bars with steel strapping, securing a tube or tubes relative to the cylindrical core, positioning backup shoes intermediate the spacer bars to define an inner curved surface for the tube coils to bear against, rotating the cylindrical core helically to wind a layer of the tube or tubes onto the spacer bars and moving the backup shoes axially and removing the steel strapping as the winding proceeds along the cylindrical core.

The invention will now be described, by way of example, with reference to the accompanying, partly diagrammatic, drawings, in which.

Figure 1:
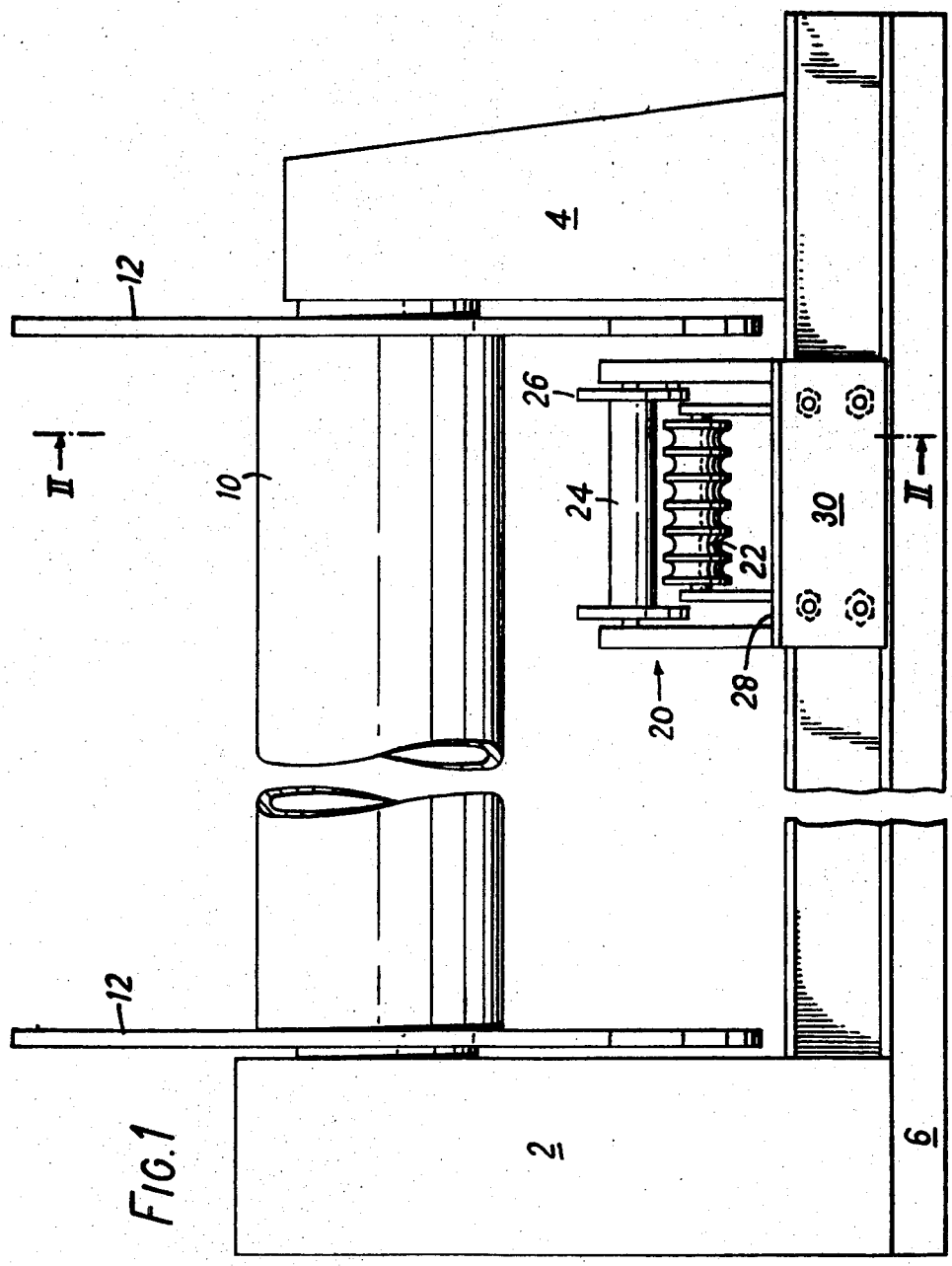
FIG. 1 is a side elevation of a coiling machine preparatory to winding-on tube lengths.
Figure 2:
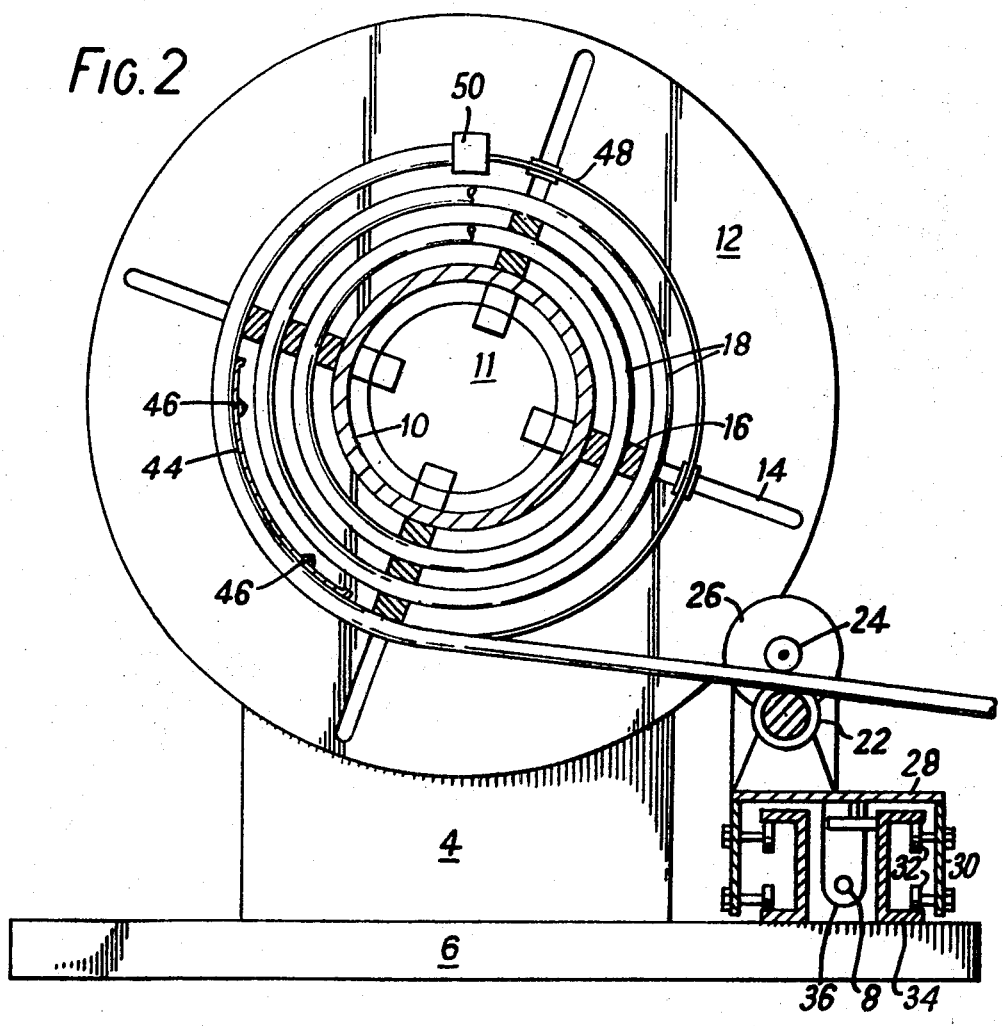
FIG. 2 is a sectional end elevation of the machine shown in FIG. 1 and taken on the line II—II of that figure but also showing layers of tubes wound on to the machine.
Figure 3:
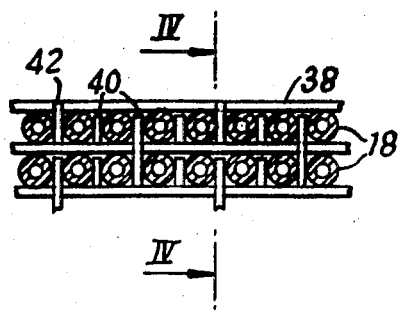
FIG. 3 is a sectional elevation of a portion of a bar of tube layers.
Figure 4:
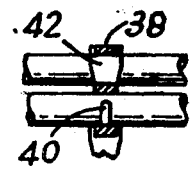
FIG. 4 is a sectional elevation taken on the line IV—IV FIG. 3.

Referring to the drawings, the machine has the form of a heavy lathe, having a fixed headstock 2 and movable tailstock 4 mounted on a bedplate 6 and is provided with a lead screw 8 or cross-traverse column. A cylindrical core 10 appropriate to the required internal diameter of the coiled tube bank is positioned between the headstock and tailstock by appropriate chucks 11 and is provided with flanges 12 having radial slots 14 carrying adjustable supports (not shown) for spacer bars 16 positioned intermediate adjacent layers 18 of tubes during coiling of the tubes. A retarding guide and auxiliary assembly 20 includes guide rolls 22 profiled to the tube semicircumference mounted on a platform 28 together with a rubber pressure roller 24 bearing against the upper surface of the tube. At each end of the pressure roller 24 there are provided braking discs which serve to impart a retarding force to the pressure roller 24. The platform 28 is provided with side flanges 30 carrying guide wheels 32 connecting with U-girders 34 mounted on the baseplate 6 so that the assembly 20 is free to move axially of the baseplate. A nut 36 connects with the lead screw 8 to traverse to assembly at a rate appropriate of the required tube pitch. A braking force is applied to the braking disc 26 and also to the axle upon which a pressure roller 24 is carried appropriate to the diameter of the coil being formed to ensure that the spring back forces arising during coiling do not cause the tube to feed at a rate in excess of the coiling speed. While in the arrangement shown the guide rolls will only accommodate six tube lengths, it will be appreciated that additional guide rolls may be provided to permit coiling of a multiplicity of tubes such as up to 24 tubes at a single pass. With such an arrangement, conveniently the guide rolls are arranged in groups and may be pivoted away from the assembly when not in use.

The radial slot 14 in the flanges 12 accommodate clamps carrying the spacer bars 16. Each spacer bar 16 includes a flat strip 38 having studs welded thereto at intervals equal to the tube overall outside diameter, the studs taking the form of pins 40.

The saddle lugs 42 are tapered outwardly and formed with a recess at the outer ends thereof to accommodate and locate the outwardly adjacent spacer bar 16. Steel strapping is used temporarily to locate the spacer bars and is cut off as coiling proceeds. Alternatively, slotted angle irons may be bolted to the faces of the flanges 12 to serve as attachment points for the spacer bars during the coiling operation.

In order to maintain substantially correct spacing and curvature between the spacer bars it is necessary to provide curved backup shoes 44 to support tubes during coiling. The shoes are provided with offset cams 46 on shafts extending the length of the shoes which cams, in the operative position, engage the immediately inwardly radially adjacent layer of tubes. Following the winding-on of the tubes immediately adjacent a backup shoe, the camshafts are rotated to move the cams to a retracted position and the shoe moved axially to receive subsequent turns of the tube coil. The process is repeated until the tube turns, and the shoes, are progressed from one end to the other of the tube coil, whereupon the shoes are removed and positioned ready for the next tube layer. Depending upon the tube size and the coil diameter, a set of shoes of a given curvature may serve for up to three layers of coiled tube within permitted tolerances for the curvature of the coils of tubes.

Anchoring means are provided to position the ends of the tubes preparatory to coiling and take the form of a block 50 welded to a hoop 48 which in turn is clamped to the flange 12. The block 50 is in the form of a split bush and coacts with the end of the tube to secure the tube. If required, pairs of tubes may be connected together by means of a bifurcation preparatory to securing to the hoop 48. Since the forces involved are somewhat less, tubes from the outer coils may be clamped directly to the spacer bars if so required, clamping being effected by means of rhombic plates bolted with a pair of bolts to the spacer bar.

A bending device (not shown) may be mounted on the platform and is adjustable in position to permit location of the device adjacent a tail portion of a coiled tube remaining following clamping of the end of the main portion to a spacer bar and cutting off the remainder of the uncoiled tube. The bending device is utilized to produce an axially extending tail by effecting a 90° bend in the tail portion.

In operation, to form a single pass, coiled tube bank, the machine is set up with a cylindrical core 10 appropriate to the required internal diameter of the coiled tube bank positioned, together with the end flanges 12, between the headstock 2 and the tailstock 4. A first layer of spacer bars 16 is secured to the flanges and held in rigid abutment with the cylindrical core 10 with steel strapping. A hoop 48 is welded to the spacer bars at the end intended to form the inlet end of the bank, from which end coiling conveniently is commenced, and a split bush bolted to the hoop. For a two-start initial tube layer the ends of two straight tube lengths are connected to the hoop 48 the tubes positioned between a pair of the guide rolls, which are set at an appropriate level and may be pivoted out of position to permit insertion of the pair of tubes. Backup shoes 44 are then positioned intermediate the spacer bars 16 to bear against the surface of the cylindrical core 10, holding the shoes in place, if necessary, with further steel strapping. The machine is then set in motion to rotate the cylindrical core, thereby bending and winding the straight tube lengths onto the spacer bars, whilst at the same time retarding the pressure roller to a speed appropriate to the coiling diameter, to overcome the effect of springback forces, and traversing the guide roller assembly to give the required pitch to the tube coils. As the coil forming operation progresses along the cylindrical core, so the steel strapping is cut and removed and the backup shoes moved along the core. Upon reaching the end of a straight tube length the machine is temporarily stopped, one of the tubes clamped to a spacer bar, and, if a tube bend is required, the location of the required tube tail bend marked, coiling continued to about 15 centimeters beyond the mark and then the tube cut off. This procedure is repeated for the other tube, the guide rollers traversed away and the bending device moved into position to make 90° bends in the tube tail portions and thereby produce axially extending tube tails. The next layer of spacer bars are then bolted to the end flanges and held in position on the initial layer using steel strapping. The procedure is then repeated to form further coiled tube layers. For the outer layers, where the spring back forces are less, the anchor blocks at the inlet end are dispensed with and the tubes are merely anchored to the spacer bars. In addition, if it is required to have substantially equal lengths of tube in each pass, the number of tubes in each layer may be increased progressively up to the capacity of the machine, namely 24, although it will be appreciated that other capacities may be accommodated with changes in the guide rollers.

It will be appreciated that opposite handed coils may be produced by driving the core in opposite directions and positioning the guide rollers accordingly.

It will also be appreciated that the tube forming the straight tube lengths may be of any suitable form including tube having spiral finning.

I claim:

1. A method of forming a coiled tube bank comprising:
    Positioning a spacer bar securely in place on a cylindrical core,
    Passing an end of a tube through guide rollers and securing said tube end to said spacer bar,
    Placing an arc-shaped shoe intermediate said spacer bar and the body of said tube.
    Rotating said cylindrical core to wind a layer of said tube onto said spacer bar,
    Said tube layer bearing against the curved surface defined by said shoe, and
    Moving said backup shoe axially relative to said core responsive to the progress of said tube along said core.

2. The method of claim 1 wherein a tube tail is subsequently formed at the extermital end portion of said tube coil comprising:
    Securing the body of said tube proximate the end thereof in position relative to said spacer bar,
    Rotating said cylinder to coil a further relatively short length of said tube,
    Cutting off the excess tubing, and
    Effecting a bend of about 90° to produce an axially extending tube tail.

3. An apparatus for use in forming a tube bank consisting essentially of:
    A base provided with supports,
    A cylindrical core rotatably mounted between said supports,
    Guide rollers having braking means mounted on said base and adapted to receive said tube therethrough,
    Anchoring means provided on said core for securing an end of said tube relative to said core after passage of said tube through said guide rollers,
    said anchoring means being a block positioned on a hoop secured to said core, and
    Means for use in rotating said cylindrical core thereby providing passage of said tube through said rollers and coiling of said tubes on said core,
    Said rollers adapted by means of said brakes to retard passage of said tubes therethrough by an amount sufficient to overcome the effect of spring back forces arising during coiling.

4. An apparatus for use in forming a tube bank consisting essentially of:
    A base provided with supports,
    A cylindrical core rotatably mounted between said supports,
    Guide rollers having braking means mounted on said base and adapted to receive said tube therethrough,
    A spacer bar secured in position on said core.
    Said spacer bar adapted to securely receive an end of said tube, and
    A backup shoe secured in position intermediate said spacer bar and said tube,
    Said shoe defining an inner curved surface for said tube to bear against in coiling, and
    Means for use in rotating said cylindrical core thereby providing passage of said tube through said rollers to coil said tubes,
    Said guide rollers adapted by means of said brakes to retard passage or said tubes therethrough by an amount sufficient to overcome the effect of spring back forces arising during coiling.

5. A method of forming tube banks consisting essentially of:
Passing an end of a tube through guide rollers,
Anchoring said tube end to a cylindrical core, and
Rotating said cylindrical core to provide passage of said tube through said guide rollers and to coil substantially all of said tube around said core.
    Said rollers retarding passage of said tubes therethrough by an amount sufficient to overcome the effect of spring back forces arising during coiling.
Securing the body of said tube proximate the end portion thereof in position relative to said core,
Rotating said cylinder to further coil a further relatively short length of said tube,
Cutting off the excess tubing, and
    Effecting a bend of about 90° to produce an axially extending tube tail.

* * * * *